UNITED STATES PATENT OFFICE.

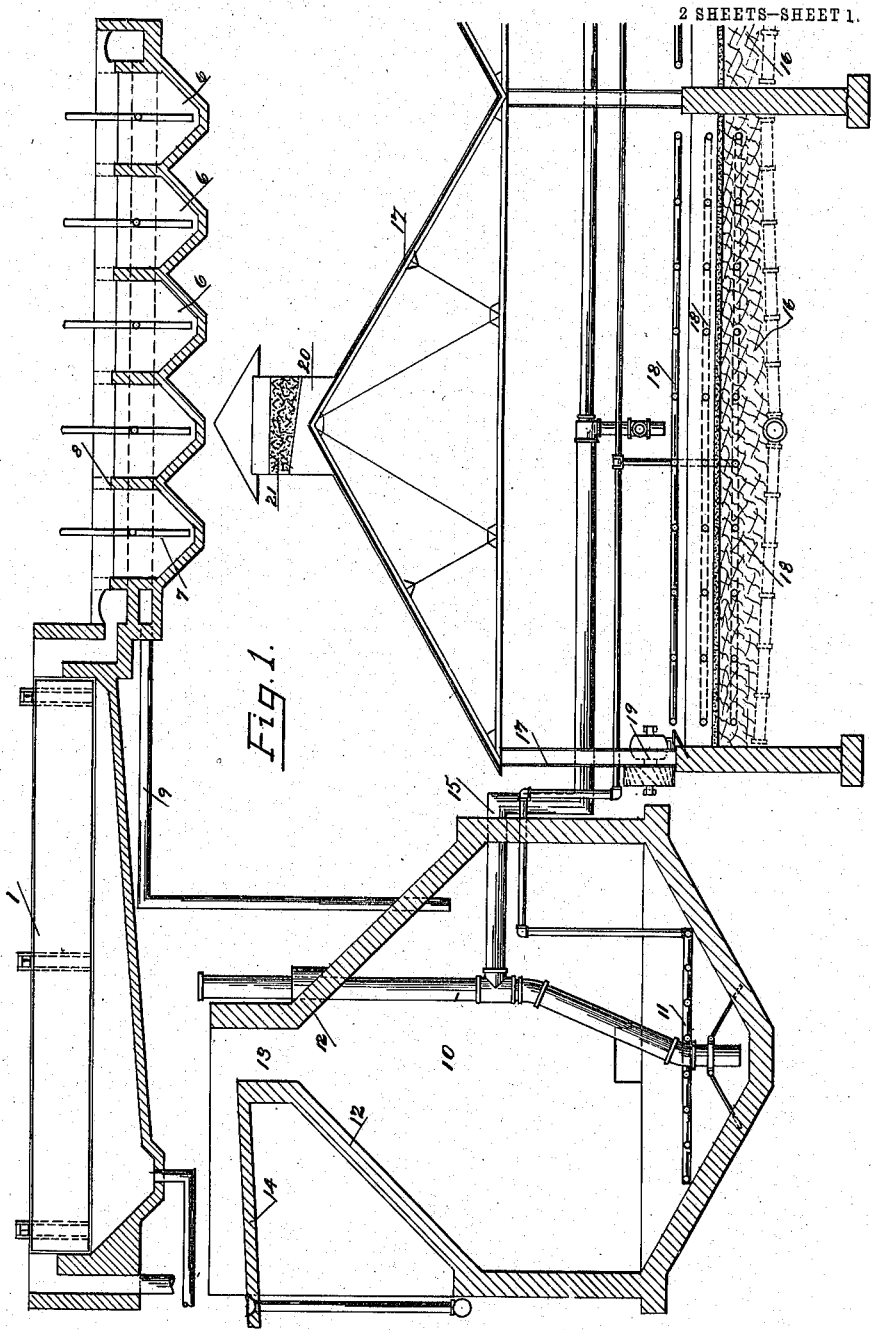

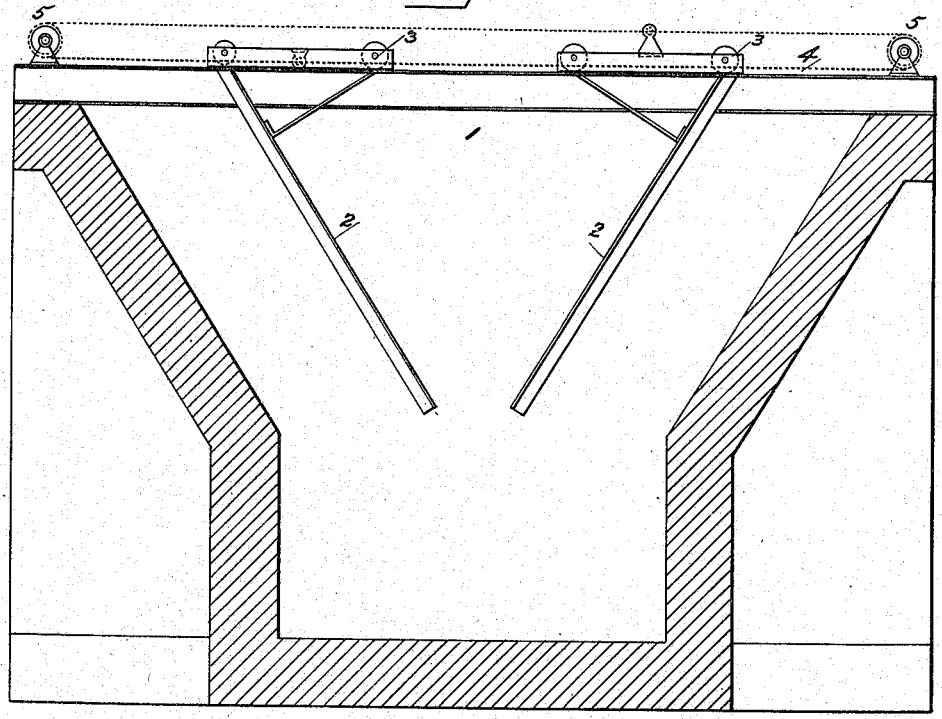

ROBERT WINTHROP PRATT, OF CLEVELAND, OHIO.

SEWAGE DISPOSAL.

1,122,156. Specification of Letters Patent. Patented Dec. 22, 1914.

Original application filed March 16, 1914, Serial No. 824,910. Divided and this application filed June 30, 1914. Serial No. 848,184.

*To all whom it may concern:*

Be it known that I, ROBERT W. PRATT, a citizen of the United States, residing at Cleveland, county of Cuyahoga, and State of Ohio, have invented certain new and useful Improvements in Sewage Disposal, of which the following is a specification.

In general the procedure which I propose may include the separating of sand or other heavy mineral matter from the sewage as an initial step in its treatment. The sewage may be then passed through a sedimentation tank in which the sludge will separate out. The sludge may then be passed into a chamber for further treatment where it is heated so as to aid and hasten the bacterial action. At this step in the process a large portion of the sludge may rise to the surface where it may be drawn off in a relatively dry state. The remainder of the sludge which settles to the bottom may be drawn off and dried on drying beds or it may be mixed with the sludge which rises before being applied to the drying beds. It may be necessary to apply the sludge which rises, by itself and without admixture of the sludge which sinks, to the drying bed. The drying bed may consist of an inclosed chamber having a floor of sand on which the sludge is spread. Steam or other heating pipes may be embedded in the sand or may be placed over the sand so as to be incorporated in the sludge itself or may be arranged in the chamber above the sludge or elsewhere. Of course hot air may be blown onto or drawn across the sand beds or they may be heated in any other way. The chamber containing the sand beds may be ventilated in a satisfactory manner and may preferably be provided with a transparent or translucent roof or sides or both and may be somewhat similar in structure to ordinary horticultural hot-houses.

While I have, in brief, outlined above the entire treatment of sewage, one or more of these steps may be omitted or one or more of the steps may be used in conjunction with other schemes for treating sewage.

In many localities when sewage is received at the disposal plant, it contains sand and other mineral matter which does not require or does not respond to the bacterial treatment of the sewage. The quantity of such matter often makes it desirable and economical to separate it from the sewage before the bacterial action takes place.

I have found that if the sewage carrying this matter is passed through a tank or a trough at a definite speed of flow, most of the suspended sand or other mineral matter will settle on the bottom of the chamber. In most places the quantity of sewage to be treated varies from time to time and the result is that the speed with which the sewage passes through the receiving chamber varies, so that in order to insure the maximum amount of settling, means must be provided for maintaining the speed of flow constant as the quantity varies. In one aspect my invention accomplishes this. In the specific device illustrated, I have provided a trough through which the effluent from the sewer passes and which has sides adjustable toward and from each other so that the cross sectional area of the channel through which the sewage passes may be varied. If the quantity of sewage increases the cross sectional area of the channel may be increased, thus equalizing the speed of flow or if the quantity of sewage decreases the sides may be adjusted toward each other, thus diminishing the cross sectional area of the channel and equalizing the speed of flow. The bottom of the trough is open so that the sand or other heavy mineral matter may settle into a receptacle below from which it may be removed from time to time. The next step involves nothing new, but merely contemplates the passage of the sewage through any known type of sedimentation tank in which the sludge separates out. The sludge thus procured is ordinarily spread upon drying beds and the bacterial action completed there. I have found, however, that the sludge may be placed in a receptacle and heated to approximately 90 degrees F. This will produce, apparently, an immediately increased and more or less violent bacterial action included in which is the production of a large amount of gas which, being entrapped in the sludge, causes a portion thereof to rise to the top of the tank in a porous, and fairly dry, spongy mass. Moreover the entrapped gas, may be caused to expand by the heat and thus increase the tendency of the spongy mass to rise. In the particular structure shown in the drawings, I have provided means for heating the sludge in a chamber which has a contracted upper portion through which the spongy mass will be forced onto a downwardly inclined draining shelf from which it may be removed from time to time. In this spongy mass the bacterial action may be entirely completed at this time and the mass withdrawn from the drain board may be disposed of as is the sludge from the drying beds. It may be desirable, however, to place the spongy mass for further drying on the ordinary drying beds and it may be so placed alone or mixed with other sludge. The remnant of the sludge which does not rise as the spongy mass, must, of course, be further dried and may be withdrawn from time to time from the bottom of the chamber.

In ordinary practice, drying beds consist of surfaces covered with sand or other porous material on which the sludge may be spread and left in the open air to dry. In warm weather when there is no rain and the sun shines daily, this final step in the treatment of the sewage may be completed in a few weeks on the drying beds, but cold weather delays the process and rain delays the drying and adds moisture to the sludge, while dark cold days do not allow the bacterial action to take place so rapidly as in the sunshine. I have found that if means are provided for regulating the temperature of the drying beds and for protecting them against the inclemency of the weather without depriving them of light, the drying process may be reduced to a more or less uniform operation and considerable time saved during most of the year. This means a large saving since it means that the acreage devoted to drying beds may be definitely calculated and limited. Ordinarily it is necessary to let sludge stand for as much as three weeks on the open air drying beds. In some seasons it is sometimes necessary to let the sludge stand for much longer times. This means that in arranging a sewage disposal plant, a sufficient area of drying beds must be provided not only to carry all the sewage that a city may have during three weeks, but considerably in excess thereof. By the use of my drying beds this final step in the treatment may be completed in a much shorter time despite weather conditions the result being accomplished at times in a few days so that such drying beds need be provided for carrying the total sewage, for the correspondingly shorter time only. The high cost of land in the neighborhood of the large towns and cities makes this a matter of great economy. In the specific device shown in the drawings, I have provided steam or other heating pipes so arranged as to regulate the temperature of the sludge on the sand bed and I have provided a transparent or translucent cover over the sand bed which will protect it from the weather. Means are provided for ventilating the inclosed chamber and the light may pass to the sludge on the drying bed through the glass or transparent or translucent cover.

The structures shown are satisfactory and efficient, but my invention is not limited to their details, but many other structures may be adopted or adapted in accordance with my invention. With this understanding, I will now proceed to describe the particular structures shown in the drawings and how they may be used to carry out my invention.

Figure 1 is a diagrammatic sectional view of apparatus for treating sewage and Fig. 2 is a sectional view through the receiving chamber.

The sewage as received from the sewers is passed through the tank or channel 1. The sides 2 of the channel consist of inclined plates carried by runners 3 which are engaged and operated by a chain 4 passing over wheels mounted on shafts 5. Any suitable means, not shown, may be provided for rotating one or both of the shafts 5 to cause the sides 2 of the channel to be moved toward or away from each other. By this means the cross section of the channel may be enlarged or decreased. Any suitable means for measuring the speed of flow of the sewage may be employed in the channel and when the speed changes the adjustment of the sides 2 of the channel may be altered so as to keep the speed more or less constant. Of course, separating the sides 2 of the channel will tend to reduce the speed of flow of the sewage through the channel. I have found that if the speed is kept low enough the greater portion of the sand or other heavy mineral matter carried by the sewage will be deposited on the bottom of the chamber, passing through the opening between the bottoms of the sides 2 of the channel. If on the other hand the speed of flow is kept high enough, substantially all of the matter which is adapted to bacterial treatment will pass through the channel. If the speed of flow is kept between these limits a separation takes place which greatly reduces the amount of solid matter to be further treated and so tends toward economy and efficiency of the plant. From the channel 1 the sewage is passed through sedimentation tanks 6 of any suitable type in which the sludge is separated out and settles to the bottom. In the diagrammatic scheme shown in Fig. 1 I have shown a series of pipes 7 through which the sludge may be pumped into a channel 8 from which it is led through a pipe 9 into a sludge treatment chamber 10. The chamber 10 is provided with heating pipes 11 and in it the sludge may be heated. I have found that one temperature to which the sludge responds is approximately 90 degrees Fahrenheit. In the chamber 10 the heat causes a portion of the sludge to rise to the surface in a more or less dry spongy mass in a relatively short time. This may be due to an increased bacterial action caused by the temperature, the bacterial action producing a quantity of gas which being entrapped in the sludge causes it to rise or it may be that the heating expands the gas present in the sludge and so causes it to rise or a combination of both effects may take place. I have shown the chamber 10 provided with upwardly and inwardly inclined sides 12 which force the rising spongy mass up into the neck or opening 13 from which, at one side leads a downwardly inclined table 14 onto which the more or less dry spongy portion of the sludge is forced and from which it may be removed and disposed of in any suitable manner. The portion of the sludge which settles to the bottom and remains in the chamber 10 may be pumped out through a pipe 15 and delivered to sand beds 16 for further treatment.

I have shown the sand beds provided with an inclosure 17 consisting of a roof of glass or other transparent or translucent material and the side walls may also be of similar material. The inclosure thus provided for the sand beds may be fitted with heating pipes 18 located in the porous beds under the sand, and immediately above the sand so as to be covered by the sludge, and also in the chamber above the sludge level. Of course, the heating pipes in the chamber above the sludge alone or in either one or in two of the locations might be employed, the intention being to provide means for heating the sludge on the sand beds. The inclosure may be ventilated and for this purpose, I have shown a fan 19 situated in the side of the chamber to produce a forced draft, there being an outlet 20 at the top of the chamber in which there may be a layer of deodorizing material 21. The inclosure protects the sludge on the sand beds against inclemency of the weather and avails of what heating comes from the sun when it shines. Since the cover allows light and heat of the sun to pass to the sludge a more satisfactory condition as regards bacterial action is produced than will be present on uncovered sand beds.

Although I have shown a complete system of sewage disposal, the entire system need not be used to come within the scope of my invention. The initial separation tank 1 may be used as an initial step in any mode of treating sewage. The tank 10 may be applied to sludge obtained in any way and whether it has sand admixed with it or not. In like manner the inclosed sand bed may be used either for sludge obtained from the bottom of the tank 10 or in any other way and it may at times be desirable to treat the spongy mass delivered on to the inclined shelf 14 in similarly inclosed sand beds. Moreover, the chamber 10 may be used as an intermediate step in any sewage disposal process whether the final treatment is effected in inclosed sand beds or not.

Of course, it will be understood that settling chambers 1, intermediate chambers 10, and inclosed sand beds may be employed of such size and in such numbers as are required by the quantity of sewage to be treated.

Claims to the apparatus shown in the drawings are not made in this application since it is intended to be covered by my application Serial Number 824910 filed March 16, 1914 of which this is a division.

I claim as my invention:

1. In the disposal of sewage, passing it through an unobstructed channel, regulating the speed of flow through the unobstructed channel, separting out the sludge, heating the sludge to separate out a part of it in a more or less dry spongy mass, and completing the sludge treatment in a sand bed in a ventilated and heated chamber provided with a translucent covering.

2. In the disposal of sewage, passing it through an unobstructed channel, regulating the speed of flow through the unobstructed channel, separating out the sludge, heating the sludge to separate out a part of it in a more or less dry spongy mass, and completing the sludge treatment in a sand bed in a chamber provided with a translucent covering.

3. In the disposal of sewage, passing it through an unobstructed channel, regulating the speed of flow through the unobstructed channel, separating out the sludge, heating the sludge to separate out a part of it in a more or less dry spongy mass, and completing the sludge treatment in a sand bed.

4. In the disposal of sewage, passing it through an unobstructed channel, regulating the speed of flow through the unobstructed channel, separating out the sludge, and completing the sludge treatment in a sand bed in a ventilated and heated chamber provided with a translucent covering.

5. In the disposal of sewage, passing it through an unobstructed channel, regulating the speed of flow through the unobstructed channel, separating out the sludge, and completing the sludge treatment in a sand bed in a chamber provided with a translucent covering.

6. In the disposal of sewage, passing it through an unobstructed channel, regulating the speed of flow through the unobstructed channel, separating out the sludge, and completing the sludge treatment in a sand bed.

7. In the disposal of sewage, separating out the sludge, heating the sludge to separate out a part of it in a more or less dry spongy mass, and completing the sludge treatment in a sand bed in a ventilated and heated chamber provided with a translucent covering.

8. In the disposal of sewage, separating out the sludge, heating the sludge to separate out a part of it in a more or less dry spongy mass, and completing the sludge treatment in a sand bed in a chamber provided with a translucent covering.

9. In the disposal of sewage, separating out the sludge, heating the sludge to separate out a part of it in a more or less dry spongy mass, and completing the sludge treatment in a sand bed.

10. A method of sewage disposal including passing it through an unobstructed channel, and regulating the speed of flow through the unobstructed channel.

11. In the disposal of sewage, separating out the sludge, and completing the sludge treatment in a sand bed in a ventilated and heated chamber provided with a translucent covering.

12. In the disposal of sewage, separating out the sludge, and completing the sludge treatment in a sand bed in a chamber provided with a translucent covering.

13. In the disposal of sewage, separating out the sludge, and completing the sludge treatment in a heated sand bed.

14. As a step in the disposal of sewage, separating out the sludge, and heating the sludge to separate out a part of it in a more or less dry spongy mass.

15. As a step in the disposal of sewage, separating out the sludge, and completing the sludge treatment in a sand bed in a ventilated and heated chamber provided with a translucent covering.

16. As a step in the disposal of sewage, separating out the sludge, and completing the sludge treatment in a sand bed in a chamber provided with a translucent covering.

Signed at Cleveland, this 24 day of June, 1914.

R. WINTHROP PRATT.

Witnesses:
KARL FENNING,
FLORINE EVANS.